United States Patent

Schoenhenz

[11] 3,880,260
[45] Apr. 29, 1975

[54] TRAILER DISC BRAKE AND FRICTION PAD THEREFOR

[75] Inventor: Daniel Schoenhenz, Epinay, France

[73] Assignee: Société Anonyme D.B.A., Paris, France

[22] Filed: July 29, 1974

[21] Appl. No.: 492,569

[30] Foreign Application Priority Data
Aug. 1, 1973 France .................. 73.28140

[52] U.S. Cl. ............ 188/72.9; 188/2 A; 188/71.1; 188/73.1; 188/82.9; 188/112
[51] Int. Cl. .......................................... F16d 55/228
[58] Field of Search ........ 188/2 A, 71.1, 72.1, 72.2, 188/72.7, 72.9, 73.1, 73.3, 250 B, 112, 82.9, 82.74

[56] References Cited
UNITED STATES PATENTS
3,405,785   10/1968   Schmid ........................... 188/72.2
3,746,132   7/1973   Jewell, Jr. ......................... 188/112

*Primary Examiner*—George E. A. Halvosa
*Attorney, Agent, or Firm*—Ken C. Decker; William N. Antonis

[57] ABSTRACT

The invention relates to a trailer disc brake and to a friction pad for such a brake. Brake applying means 38, 42 are associated with a torque taking member 10 to urge at least two pads 18, 20 against a disc 12. Front 26 and rear 34 abutment means are provided to anchor the pads in accordance with the direction of disc rotation. A clearance is provided between the abutment means of at least one 18 of the pads, and the axial travel of the brake applying means is greater or less than the axial travel required to apply the pad 18 to the disc depending on whether the pad 18 is anchored against the front 26 or the rear 34 abutment means respectively.

10 Claims, 9 Drawing Figures

PATENTED APR 29 1975　3,880,260

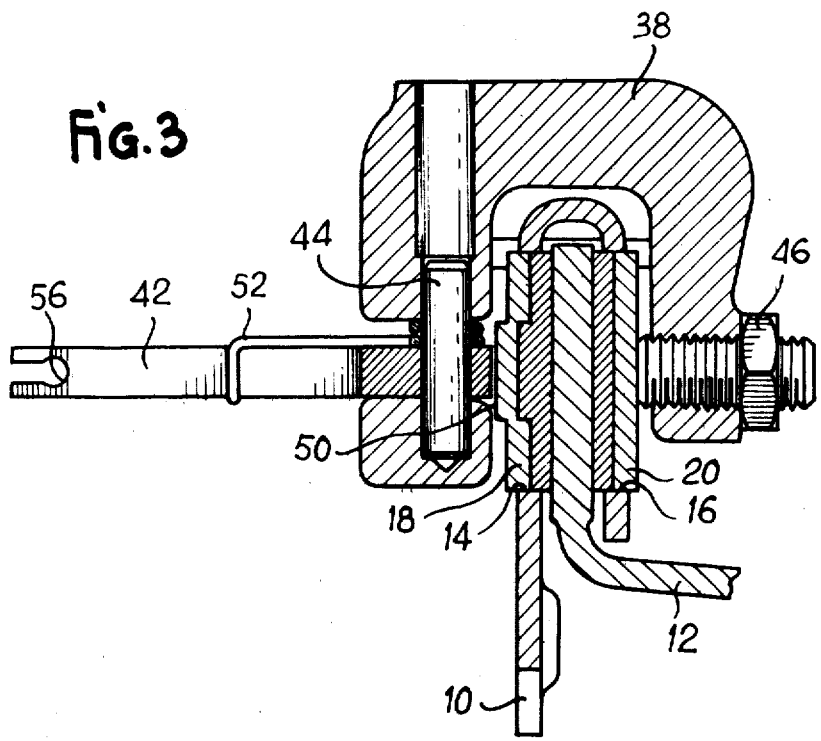
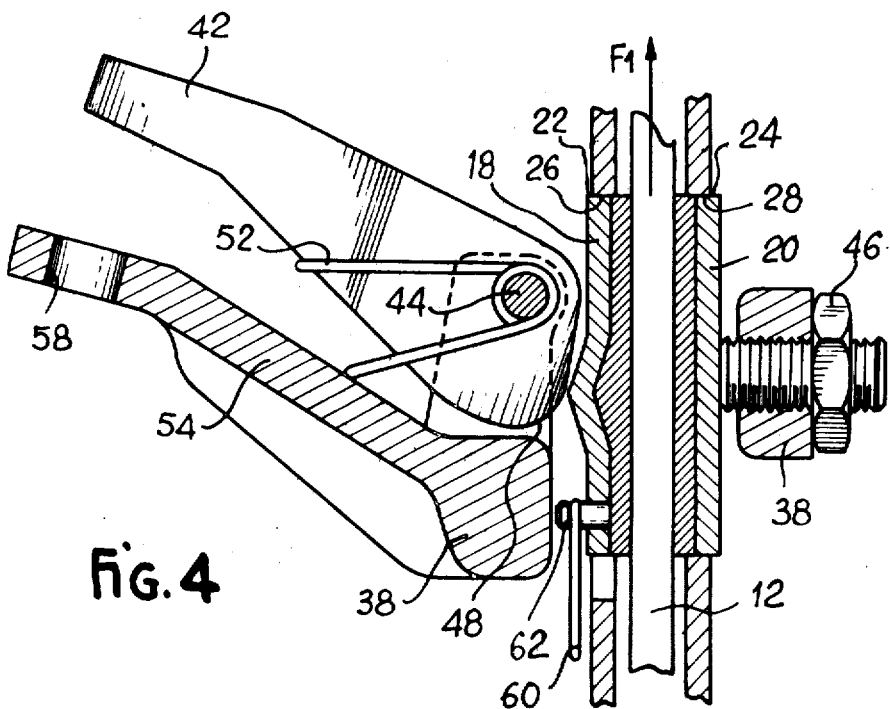

3,880,260

TRAILER DISC BRAKE AND FRICTION PAD THEREFOR

This invention concerns a trailer disc brake and a friction pad for this brake.

More particularly, the invention relates to trailer disc brakes in which the brakes are operated by an inertia control, usually inserted in the linkage connecting the towing vehicle to the trailer. In this type of control, the brake is operated if the trailer moves closer to the towing vehicle, so that the brakes on the trailer can be actuated immediately after those on the towing vehicle are applied. However, this type of control has the disadvantage of undesired operation of the trailer brakes when the vehicle is backing.

To overcome this disadvantage, the invention proposes a trailer disc brake of the type in which brake applying means are associated with a torque taking member to urge at least two brake pads into frictional engagement with corresponding sides of a rotary disc, maintaining means being provided to avoid radial escape of the pads with respect to the disc axis, front and rear abutment means being provided to anchor the pads in accordance with the direction of disc rotation. The brake according to the invention is characterized in that there is a predetermined clearance between at least one of the pads and the abutment means, the said one pad and the brake applying means having cooperating surfaces such that the travel of the applying means parallely to the disc axis is greater than the travel required for applying the one pad to the disc when the one pad is anchored against the front abutment means, whereas the travel of the brake applying means parallely to the disc axis is less than the travel required for applying the one pad to the disc when the one pad is anchored against the rear abutment means.

In a preferred embodiment of the invention, the brake-applying means comprise at least one lever pivotable about a pivot substantially parallel to the plane of the disc and associated with the torque taking member so as to cooperate with the one pad by way of a cam surface, return means being provided to urge the lever into its idle position, the maximum distance between the cam surface and the said pivot being greater than the distance between the pivot and the cooperating one pad face parallely to the disc axis when the one pad is anchored against the front abutment means said maximum distance being less than the distance between the pivot and the cooperating one pad face parallely to the disc axis when the one pad is anchored against the rear abutment means.

The invention further relates to a pad for such a brake, comprising a lining and a lining backing plate, the lining backing plate comprising two circumferential edges extended by two substantially semi-circular anchoring edges, the side of the backing plate without lining comprising an extension adapted to cooperate with the cam surface of the lever.

The invention will now be described with reference to the accompanying drawings, in which:

FIG. 3 is a side view of the brake shown in FIG. 1, in section along a line 3—3 in FIG. 2;

FIG. 4 is a partial sectional view along a line 4—4 in FIG. 1, the disc rotating in the direction corresponding to forward motion of the vehicle;

Figure 1:
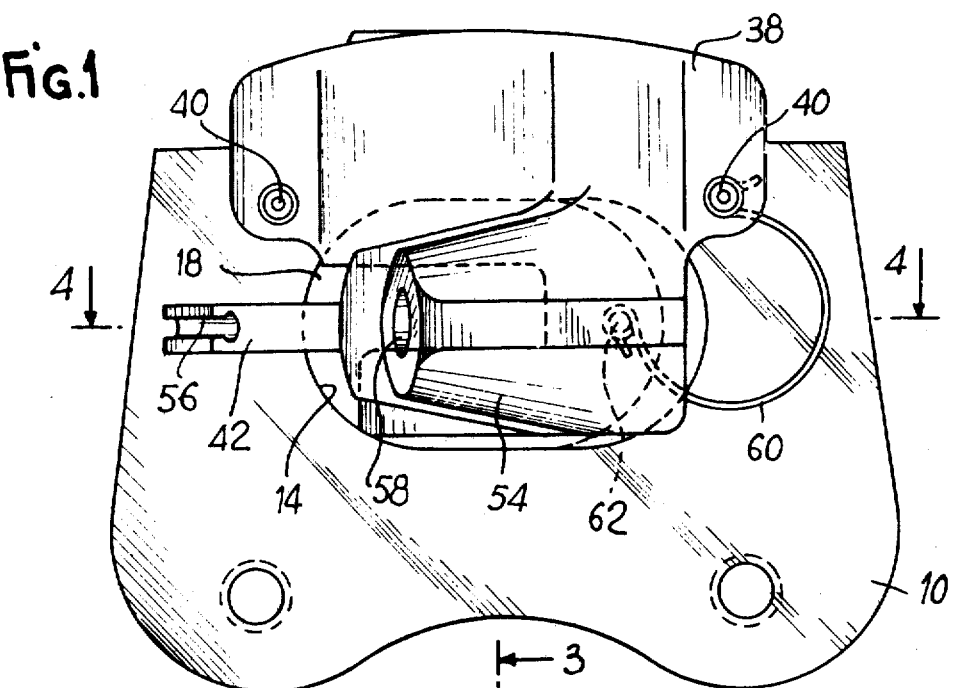
FIG. 1 is a transverse view of a disc brake embodying the invention.
Figure 2:
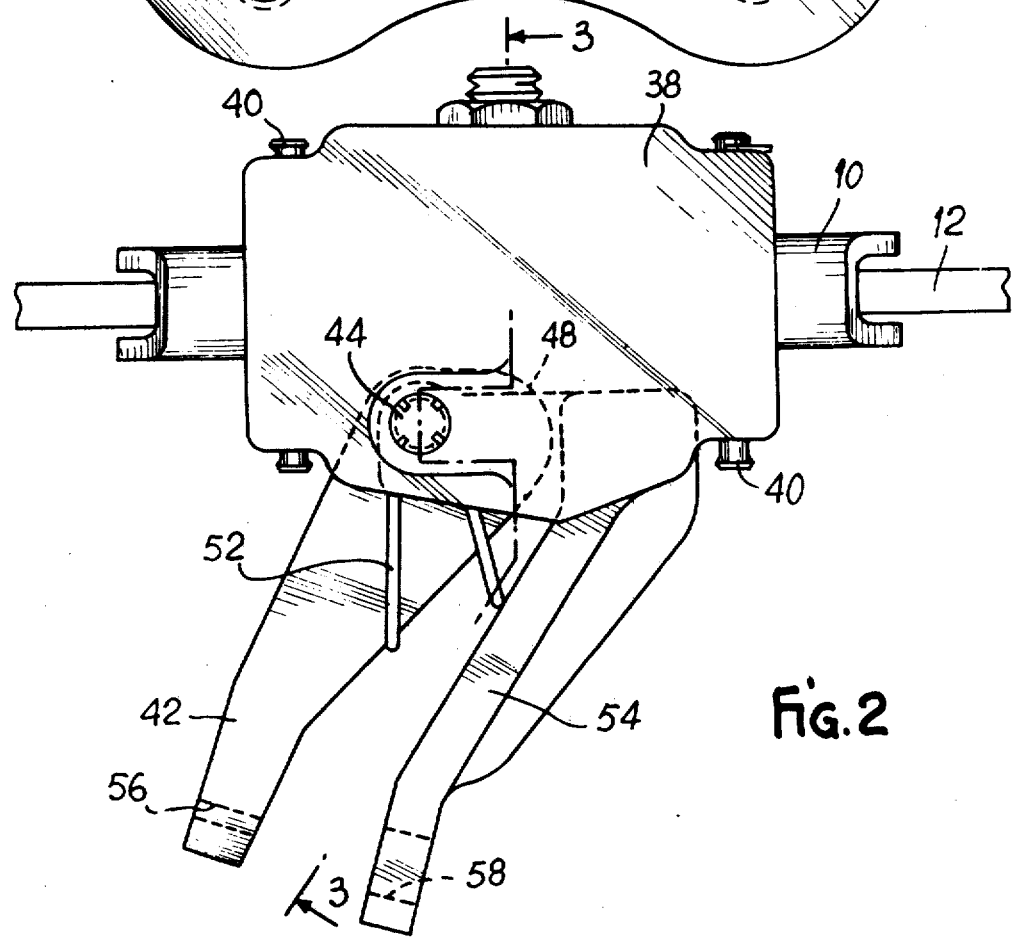
FIG. 2 is a plan view of the brake shown in FIG. 1.
Figure 5:
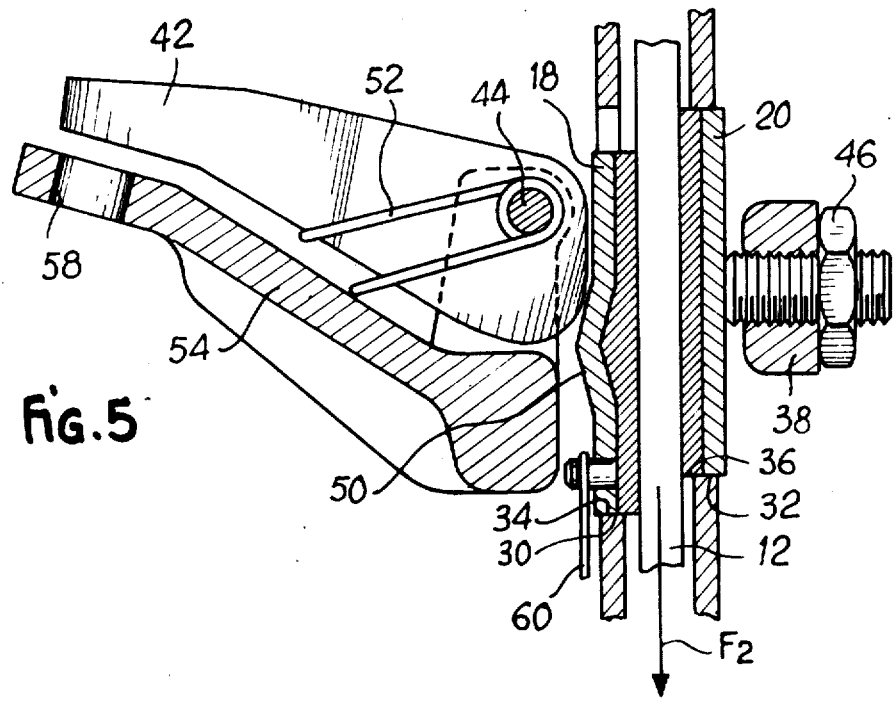
FIG. 5 is a view similar to FIG. 4 but with the disc rotating in the direction corresponding to reverse motion of the vehicle.

In the disc brake illustrated in FIGS. 1 to 5, a torque taking member 10 attached to a fixed portion of the vehicle (not shown) straddles a rotary disc 12 and forms on opposite sides of the disc two flat portions substantially parallel to the plane of the disc and containing two apertures 14, 16. Two brake pads 18, 20 are mounted in the apertures 14, 16 respectively and are guided and supported circumferentially on the inside and outside of the brake by means of the inner and outer circumferential edges of the apertures 14 and 16 forming maintaining means and avoiding radial escape of the pads. The pads 18, 20 are anchored by way of their forward anchoring edges 22, 24 on surfaces 26, 28 forming front abutment means in the respective apertures 14, 16, when the disc 12 rotates in the direction of an arrow F1 in FIG. 4, which is the normal direction of rotation of the disc 12. Conversely, the pads 18, 20 become anchored by way of their rear anchoring edges 30, 32 on surfaces 34, 36 forming rear abutment means in the respective apertures 14, 16 when the disc 12 turns in the direction of an arrow F2 in FIG. 5, which is the reverse direction of disc rotation anchoring edges 30, 32 and 22, 24 are substantially semi circular. The distance separating the front and rear edges 24, 32 of the pad 20 is substantially the same as that separating the surfaces 28, 36 in the aperture 16. However, as FIGS. 4 and 5 show, the distance separating the front and rear edges 22, 30 of the pad 18 is less, by a predetermined clearance, than the distance separating the surfaces 26, 34 in the aperture 14, for a reason explained below.

Brake-applying means are provided to urge the pads 18, 20 into frictional contact with the disc 12 when the brake is operated. These brake-applying means comprise a caliper 38 slidable by way of two columns 40 on the torque taking member 10, and a lever 42 pivoted on a pivot pin 44 mounted in the caliper 38. The caliper 38 straddles the disc 12 and operates the pad 20 by way of adjustment means 46 for compensate lining pad wear. The lever 42 bears a cam surface 48, which normally cooperates with an axial extension 50 on the pad 18 when the latter is anchored against the surface 26, as shown in FIG. 4. When the pad 18 is anchored against the surface 34, however, as shown in FIG. 5, the maximum effective radius of the cam surface 48 is less than the axial distance separating the pivot pin 44 from the backing plate of the pad 18, the extension 50 now being offset relative to the cam surface 48.

Return means comprising a spring 52 wrapped round the pivot pin 44 and bearing on an arm 54 of the caliper 38 are provided to urge the lever 42 away from the arm 54. The free end of the lever 42 contains a slot 56 adapted to receive the end of an operating cable (not shown), and the free end of the arm 54 contains a hole 58 adapted to permit passage of the cable and to receive the end of the cable's protective sheath (not shown).

The operating cable for the lever 42 is preferably connected to a linkage connecting a towing vehicle to its trailer, the brake embodying the invention being installed in the trailer.

An annular spring 60 bearing on one of the columns 40 normally urges the pad 18 into contact with the front surface 26 on the fixed support. A screw 62 connects the spring 60 to the pad 18.

The disc brake illustrated in FIGS. 1 to 5 operates as folows:

Any movement bringing the trailer closer to the towing vehicle causes the lever 42 to be operated by the operating cable and effects inertia control of the lever 42. The brake must therefore be ineffective when the vehicle and its trailer are reversing.

When the vehicle and trailer are moving forwards, the disc 12 rotates in the direction indicated by the arrow F1 in FIG. 4, and the various elements of the brake are in the positions shown in this Figure. The spring 60 urges the pad 18 against the front surface 26 in the aperture 14. The cam surface 48 on the lever 42 is now in axial alignment with the axial extension 50 of the backing plate of the pad 18. When the lever 42 is actuated by the operating cable (not shown), the cam surface 48 urges the pad 18, by way of its extension 50, into frictional contact with the disc 12. As the disc is turning in the direction indicated by the arrow F1, the pad 18 is entrained in this direction and remains anchored against the surface 26, so that during subsequent pivoting of the lever 42 about its pin 44 the pad 18 continues to be applied to the disc and, due to reaction, causes the caliper 38 to slide along the columns 40 towards the left in FIG. 4, so that the pad 20 is applied to the other side of the disc and the trailer is braked.

When the vehicle and its trailer are reversing, the disc 12 turns in the direction F2 in FIG. 5. When the pad 18 is brought into frictional contact with the disc, the latter entrains the pad in the direction of the arrow F2, bringing the rear edge 30 on to the rear surface 34 as shown in FIG. 5. The extension 50 is no longer axially aligned with the cam surface 48, and the maximum effective radius of the cam surface 48 is too short to bring the latter in contact with the backing plate of the pad 18, with the result that the brake cannot be applied.

It will be noted that a brake according to this embodiment cannot be used as a parking brake if the trailer is likely to move backwards while parked.

Figure 6:
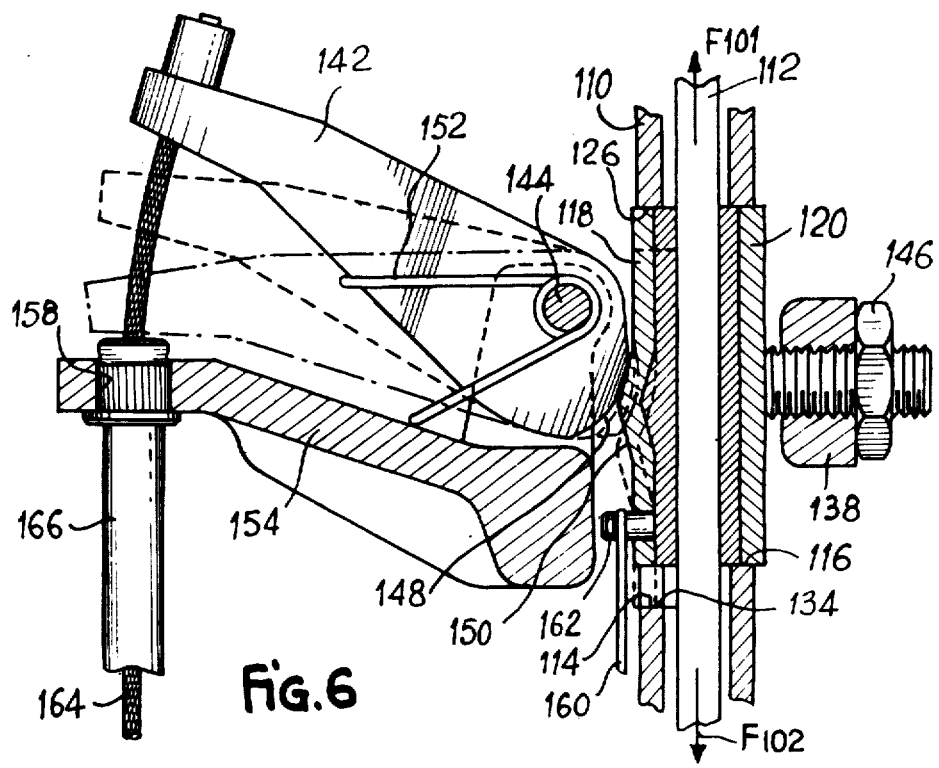
FIG. 6 is a partial sectional view for another brake embodying the invention.

FIG. 6 illustrates an improvement on the brake shown in FIGS. 1 to 5, capable of overcoming this disadvantage while retaining the advantages of the previous embodiment.

In the brake shown in FIG. 6, structural elements corresponding to those in the embodiment shown in FIGS. 1 to 5 bear the same references plus 100.

As in the previous embodiment, a lever 142 pivotable on a pin 144 bears a cam surface 148 capable of operating an axial extension 150 of a brake pad 118 so as to urge the latter on to a rotary disc 112. Due to reaction a second brake pad 120 is urged on to the other side of the disc by way of columns (not shown) on a torque taking member 110, also straddling the disc. The torque taking member 110 contains an aperture 116 in which the pad 120 can axially slide and is anchored, and an aperture 114 in which the pad 118 can axially slide and is anchored. The distance separating the front and rear edges of the pad 118 is less, by a predetermined clearance, than the distance separating the front and rear surfaces of the aperture 114. The pad 118 is normally biased and braced against the front surface 126 by a spring 160, which is supported on one of the columns for the sliding caliper 138 and a screw 162 attached to the pad 118, as shown by solid lines in FIG. 6. The lever 142 is biased away from an arm 154 of the caliper 138 by return means including a spring 152 wrapped round the pin 144, in the position shown by solid lines in FIG. 6, so that the cam surface 148 is normally in axial alignment with the extension 150 on the backing plate of the pad 118. Adjustment means 146 for compensate lining pad wear are inserted between the caliper 138 and the pad 120. An operating cable 164 is fastened to the free end of the lever 142, and its protective sheath 166 is supported on the free end of the arm 154.

The cable 164 is preferably connected to a linkage coupling a towing vehicle to a trailer, which is generally fitted with two brakes embodying the invention. An embodiment of such a linkage is illustrated diagrammatically in FIGS. 7 to 9. As these Figures show, the cable 164, which is normally connected to the two levers 142 of the trailer brakes, runs in a groove in a member 168 operated by an arm 170 pivoted at 172 on a portion 174 attached to the trailer (not shown). A parking brake lever 176, pivoted at 178 on the portion 174, bears at one end a pawl 180 cooperating with a ratchet 182 fixed to the trailer portion 174. At its other end the lever 176 bears a cup member 184 freely traversed by the cable 164 and capable of receiving the member 168 and of pushing it to the right in FIGS. 7 to 9.

A cylindrical portion 186 with a ball joint 188 is articulated on the towing vehicle (not shown). The portion 186 bears an extension 190 capable of stressing the free end 192 of the arm 170, counteracting a compression spring 194 which normally urges the portion 186 away from the portion 174. A stop 196 on the cylindrical portion 186 limits the travel of the trailer portion 174 towards the towing vehicle.

Operation of the brake shown in FIG. 6 when actuated by the linkage illustrated diagrammatically in FIGS. 7 to 9 will now be described.

Figure 7:
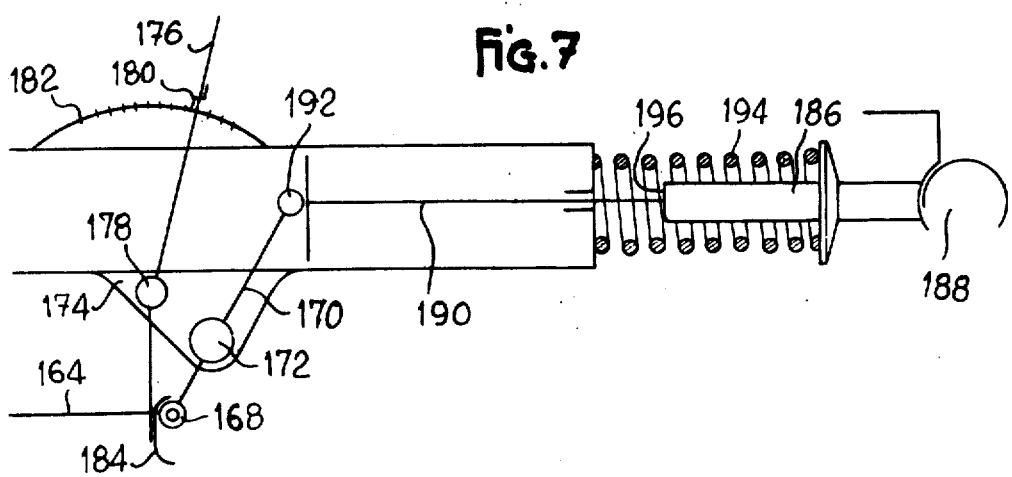
FIG. 7 shows diagrammatically an operating linkage for the brake shown in FIG. 6, in its idle position.

When idle the linkage components are in the positions shown in FIG. 7, and the brake components are in the positions shown by solid lines in FIG. 6. The spring 152 urges the lever 142 away from the arm 154, thereby holding the member 168 in the cup member 184 on the parking brake lever 176, the latter being in its idle position. The spring 160 urges the pad 118 on to the front surface 126, and the cam surface 148 is opposite the extension 150 of the pad 118. The spring 194 is tensioned and urges the trailer away from the towing vehicle.

Figure 8:
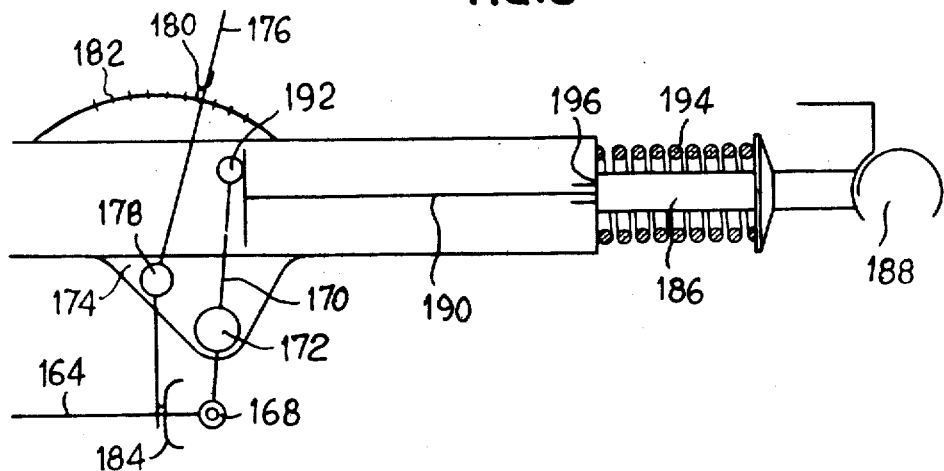
FIG. 8 shows the linkage of FIG. 7 diagrammatically in the position for inertia operation of the brake shown in FIG. 6.

When the vehicle and trailer are moving normally and the driver operates the vehicle brakes, the vehicle slows down and the trailer tends to move close to it, so compressing the spring 194 to bring the trailer portion 174 into contact with the abutment 196 (FIG. 8). The extension 190 therefore pushes the end 192 of the arm 170, causing the latter to pivot and to draw the cable 164 to the right in FIG. 8, by a distance depending on the clearance normally existing between the abutment 196 and the corresponding abutment on the portion 174. The lever 142 now takes up the position shown by broken lines in FIG. 6, and the brake is applied as in the first embodiment if the disc is rotating in the direction of an arrow F101, corresponding to forward motion of the trailer. If, however, the disc is rotating in the direction of an arrow F102 corresponding to reverse motion of the trailer, the pad 118 takes up the position shown in broken lines in FIG. 6, so that the brake cannot be applied.

Figure 9:
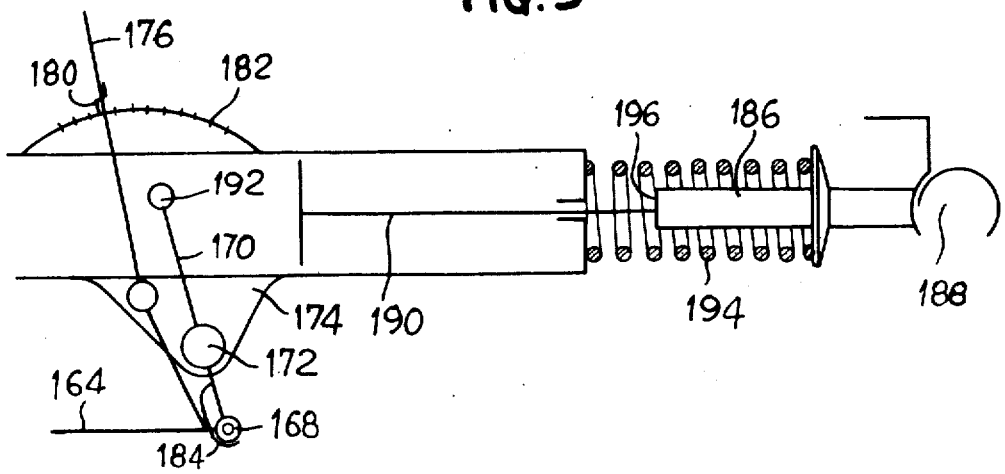
FIG. 9 shows the linkage of FIG. 7 diagrammatically in the position for manual operation of the brake shown in FIG. 6.

When the vehicle and trailer are stationary, the spring 194 is in its unstressed position, and operation of the parking brake lever 176 enables the cup member 184 to move the member 168 and cable 164 to the right as shown in FIG. 9, by a distance greater than that corresponding to operation by the arm 170, and the lever 142 is moved into the position shown by chain lines in FIG. 6. As a result, whatever the slope of the road surface at the parking site selected for the trailer, the travel available to the lever 142 when it is operated by the parking brake lever 176 is sufficient to apply the pad 118 to the disc 112 and, by reaction, to apply the pad 120 to the other side of the disc. Operation of the parking brake is therefore possible whatever the position of the extension 150 relative to the cam surface 148, that is to say, irrespective of whether the pad 118 is anchored against the front surface 126 or against the rear surface 134.

The invention can of course be applied to brakes in which the applying means are different from those described above. In particular, there could be a fixed caliper and two levers of the same kind as the levers 42 and 142, operating by way of two cam surfaces pads of the same kind as the pads 18 and 118, each of which has an axial extension and predetermined play in a direction tangential relative to the disc.

I claim:

1. A trailer disc brake in which brake applying means are associated with a torque taking member to urge at least two brake pads into frictional engagement with corresponding sides of a rotary disc, maintaining means being provided to avoid radial escape of the pads with respect to the disc axis, front and rear abutment means being provided to anchor the pads in accordance with the direction of disc rotation, wherein there is a predetermined clearance between at least one of the pads and the abutment means, the said one pad and the brake applying means having cooperating surfaces such that the travel of the brake applying means parallely to the disc axis is greater than the travel required for applying the one pad to the disc when the one pad is anchored against the front abutment means, whereas the axial travel of the brake applying means is less than the travel for applying the one pad to the disc when the one pad is anchored against the rear abutment means.

2. A disc brake as claimed in claim 1, wherein resilient means are provided to urge the one pad on to the front abutment means.

3. A disc brake as claimed in claim 1 wherein, additional brake applying means are provided to urge the one pad into contact with the disc irrespective of the abutment means against which the one pad is anchored.

4. A disc brake as claimed in claim 1, wherein the torque taking member comprises at least one flat portion substantially parallel to the plane of the disc and containing an aperture which receives the one pad, said aperture defining two circumferential edges constituting the maintaining means and two other edges constituting the front and rear abutment means respectively.

5. A disc brake as claimed in claim 1, wherein the brake applying means comprises at least one lever pivotable about a pivot substantially parallel to the plane of the disc and associated with the torque taking member so as to cooperate with the one pad by way of a cam surface, return means being provided to urge the lever into its idle position, the maximum distance between the cam surface and the said pivot being greater than the distance between the pivot and the cooperating one pad face parallely to the disc axis when the one pad is anchored against the front abutment means, said maximum distance being less than the distance between the pivot and the cooperating one pad face parallely to the disc axis when the one pad is anchored against the rear abutment means.

6. A disc brake as claimed in claim 5, wherein the said one pad face comprises an axial extension normally engaged by the cam surface when the one pad is anchored against the front abutment means.

7. A disc brake as claimed in claim 5 wherein said pivot is attached to a caliper slidable on at least one axial column of the torque taking member, the caliper straddling the disc to urge the other pad towards the disc.

8. A disc brake as claimed in claim 7, wherein adjustment means are inserted between the other pad and the caliper.

9. A pad for a brake as claimed in claim 5 comprising a lining and a lining backing plate, wherein the lining backing plate comprises two circumferential edges extended by two substantially semi-circular anchoring edges, the side of the backing plate without lining comprising an extension adapted to cooperate with the cam surface of the lever.

10. A pad as claimed in claim 9, wherein said extension is formed by at least two planes inclined relative to said side of the backing plate.

* * * * *